US012066344B2

(12) United States Patent
Wang et al.

(10) Patent No.: US 12,066,344 B2
(45) Date of Patent: Aug. 20, 2024

(54) LOCATION OF INTEREST ALTITUDE AND DETERMINING CALIBRATION POINTS

(71) Applicant: Apple Inc., Cupertino, CA (US)

(72) Inventors: Lei Wang, Santa Clara, CA (US); William J. Bencze, Half Moon Bay, CA (US); Kumar Gaurav Chhokra, San Mateo, CA (US); Fatemeh Ghafoori, Santa Clara, CA (US); Stephen P. Jackson, Cupertino, CA (US); Cheng Jia, Cupertino, CA (US); Yi-Wen Liao, San Jose, CA (US); Glenn D. Macgougan, Cupertino, CA (US); Isaac T. Miller, Half Moon Bay, CA (US); Alexandru Popovici, Mountain View, CA (US); Christina Selle, Los Altos, CA (US); Aditya Narain Srivastava, Fremont, CA (US); Richard Warren, Redwood City, CA (US); Michael P. Dal Santo, Cupertino, CA (US); Pejman Lotfali Kazemi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 457 days.

(21) Appl. No.: 17/163,180

(22) Filed: Jan. 29, 2021

(65) Prior Publication Data
US 2021/0396619 A1 Dec. 23, 2021

Related U.S. Application Data

(60) Provisional application No. 63/041,787, filed on Jun. 19, 2020.

(51) Int. Cl.
*G01L 27/00* (2006.01)
*H04W 4/02* (2018.01)
*H04W 4/38* (2018.01)
*H04W 4/90* (2018.01)

(52) U.S. Cl.
CPC .......... *G01L 27/005* (2013.01); *H04W 4/025* (2013.01); *H04W 4/38* (2018.02); *H04W 4/90* (2018.02)

(58) Field of Classification Search
CPC ...... G01L 27/005; H04W 4/025; H04W 4/38; H04W 4/90
See application file for complete search history.

(56) References Cited

U.S. PATENT DOCUMENTS

| 10,848,911 B1 * | 11/2020 | Mallesan ............ G01S 5/02695 |
| 2009/0123048 A1 | 5/2009 | Leroux et al. |
| 2011/0018732 A1 | 1/2011 | Cho et al. |
| 2012/0309410 A1 | 12/2012 | Marti et al. |
| 2013/0260771 A1 | 10/2013 | Wirola et al. |

(Continued)

*Primary Examiner* — James J Yang
(74) *Attorney, Agent, or Firm* — Aikin & Gallant, LLP

(57) ABSTRACT

Described herein are techniques to enable a mobile device to perform multi-source estimation of an altitude for a location. A baseline altitude may be determined at ground level for a location and used to calibrate a barometric pressure sensor on the mobile device. The calibrated barometric pressure sensor can then estimate changes in altitude relative to ground level based on detected pressure differentials, allowing a relative altitude to ground to be determined. Baseline calibration for the barometric sensor calibration can be performed to determine an ambient ground-level barometric pressure.

18 Claims, 12 Drawing Sheets

(56) References Cited

U.S. PATENT DOCUMENTS

| | | |
|---|---|---|
| 2014/0075181 A1* | 3/2014 | Raghupathy ............ G01S 19/05 |
| | | 713/150 |
| 2014/0345302 A1 | 11/2014 | Ziegler |
| 2015/0170075 A1 | 6/2015 | Self et al. |
| 2016/0037305 A1 | 2/2016 | Pan et al. |
| 2016/0047649 A1* | 2/2016 | Edge ........................ H04B 1/40 |
| | | 73/384 |
| 2016/0106368 A1 | 4/2016 | Wu et al. |
| 2017/0280301 A1 | 9/2017 | Chang et al. |
| 2017/0310827 A1 | 10/2017 | Mehta et al. |
| 2018/0249290 A1* | 8/2018 | Ivanov .................... G06T 17/05 |
| 2018/0275261 A1 | 9/2018 | Khan et al. |
| 2019/0047788 A1 | 2/2019 | Winkler |
| 2019/0130724 A1 | 5/2019 | Harrod, IV et al. |
| 2020/0249026 A1 | 8/2020 | Ivanov et al. |
| 2021/0055372 A1 | 2/2021 | Rauhala et al. |
| 2021/0400615 A1 | 12/2021 | Smith et al. |
| 2021/0400618 A1 | 12/2021 | Smith et al. |

\* cited by examiner

LOCATION OF INTEREST ALTITUDE AND DETERMINING CALIBRATION POINTS

CROSS-REFERENCE

This application claims the benefit of priority of U.S. Provisional Application No. 63/041,787 filed Jun. 19, 2020 which is incorporated herein by reference.

FIELD

Embodiments described herein relate to technique to generate altitude estimates for locations of interest and determining calibration points for a barometric pressure sensor.

BACKGROUND INFORMATION

An electronic device can include a location services system that provides location-based functionality, such as enabling the electronic device to estimate the location for the device. Location estimation for the device can be performed, for example, via a satellite-based positioning system (e.g., GPS, etc.) or a wireless positioning system that enables location triangulation based on radio signals received from a wireless base station. The location services system can also determine a set of locations that may be locations of interest or significance to a user of the electronic device. Under some circumstances, metadata about a significant location or a location of interest can be determined based on map data or metadata for the geographic area of the location of interest. However, map data or metadata may not provide all of the information about a location, particularly in well developed areas, such as urban environments.

SUMMARY OF THE DESCRIPTION

Embodiments described herein provide techniques to enable a mobile device to perform multi-source estimation of an altitude for a location. A baseline altitude may be determined at ground level for a location and used to calibrate a barometric pressure sensor on the mobile device. The calibrated barometric pressure sensor can then estimate changes in altitude relative to ground level based on detected pressure differentials, allowing a relative altitude to ground to be determined. Baseline calibration for the barometric sensor calibration can be performed to determine an ambient ground-level barometric pressure.

One embodiment provides an electronic device comprising one or more memory devices to store instructions and one or more processors to execute the instructions. The instructions are associated with an operating system executed by the one or more processors of the electronic device. The instructions cause the one or more processors to determine, by a location subsystem of the operating system, geographic coordinates for a first location, determine, via the location subsystem, an altitude estimate for the first location, determine, via the location subsystem, geographic coordinates for a second location, determine, via the location subsystem, an altitude estimate for the second location, and disambiguate the first location from the second location based on altitude estimates for the first location and the second location in response to a determination that the first location and the second location have similar geographic coordinates. The electronic device can then store the first location and the second location as separate locations within a location database of the location subsystem. The location database is stored in the one or more memory devices.

One embodiment provides a method comprising, on an mobile device having one or more processors to execute instructions associated with an operating system on the mobile device, determining, via a location subsystem of the operating system of the mobile device, geographic coordinates for a first location, determining, via the location subsystem, an altitude estimate for the first location, determining, via the location subsystem, geographic coordinates for a second location, determining, via the location subsystem, an altitude estimate for the second location, and disambiguating the first location from the second location based on altitude estimates for the first location and the second location in response to a determination that the first location and the second location have similar geographic coordinates. The method additionally includes storing the first location and the second location as separate locations within a location database of the location subsystem.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1:
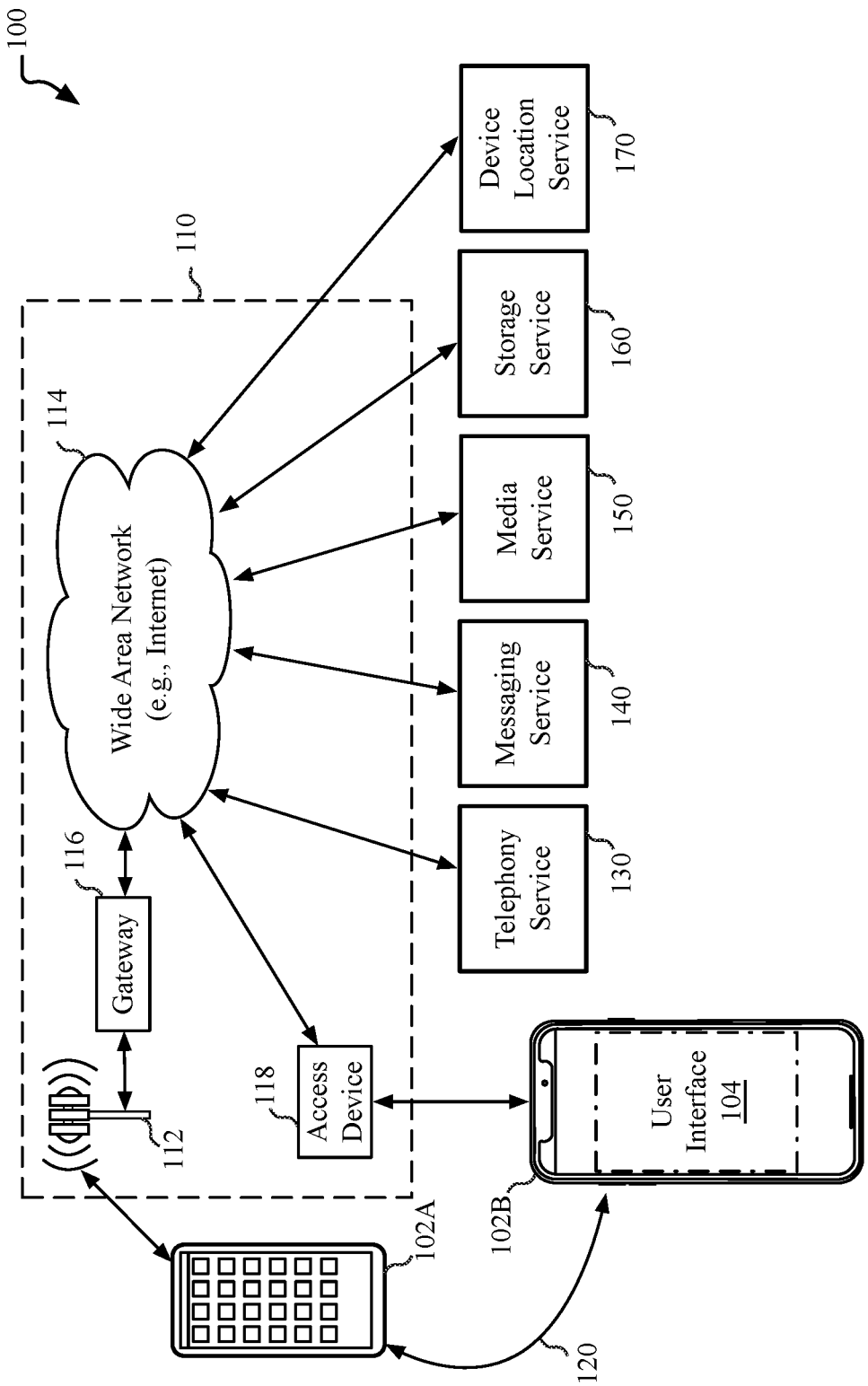
FIG. 1 is a block diagram of a network operating environment for mobile devices.

Geographic coordinates associated with a visited location or location of interest can be determined based on actions performed via a user interface of a mobile device or while carrying the mobile electronic device. A visited location is a location that a user of the mobile device dwells for over a threshold period of time. A location of interest is a location that has been visited multiple times by a user. Additionally, a location of interest that receives frequent visits of an extended duration may be determined to be a significant location. The visits may be detected by the mobile device or another device that is associated with a cloud services account of the user of the mobile device. In one embodiment, a user may manually designate a location (e.g., home, work, etc.) as significant. In the event that a user does not designate significant locations, such as a home or work location, location clusters can be used to estimate a home and/or work location for a user. As described herein, a relevant location is a location that has been visited by a user, a location that has been determined to be of interest to the user, or a location that has been designated by the user as a significant location.

However, existing systems do not take into account altitude or Z-axis coordinates associated with visited locations, location of interests, significant locations, or other types of locations of relevance to a user. Where a user lives or works in a multi-floor building in which multiple locations of relevance have close or overlapping longitude and latitude coordinates, it would be beneficial if those locations could be disambiguated based on an altitude or Z-axis coordinate associated with those locations. This issue is addressed by an embodiment described herein that provides a technique for determining an altitude for a location that has been visited by a user. As single instantaneous altitude determinations may be inaccurate, multiple altitude determinations for a location may be aggregated over time to progressively refine the altitude estimate for a location.

To enable reliable determination of an altitude of a location, it would be beneficial for the mobile electronic device to have a reliable mechanism for determining its altitude. Different altitude sources may be available at any given time, with various benefits and drawbacks being associated with each source. A digital elevation model (DEM) can be used to determine a baseline altitude for a given set of geographic coordinates. The DEM includes a terrain map that specifies a ground level altitude for respective coordinates in a mapping database. However, DEM data may not be available for all geographic coordinates, or may not have sufficient resolution for high-density locations. DEM altitude also does not take into account the potential presence of the mobile device within a structure above or below ground level. A geometric altitude may be able to be determined via a satellite-based location and navigation system. However, satellite-based geometric altitude determinations may be inaccurate or unavailable while indoors due to signal attenuation. A mobile device can include a barometric sensor that can be used to estimate the current altitude of the device. However, barometric sensor readings may be impacted by non-altitude related factors, such as weather, wind, or heating, ventilation, and air conditioning (HVAC) systems.

To balance the benefits and drawbacks to various altitude determination systems, embodiments described herein provide techniques to enable the multi-source estimation of an altitude for a location. In one embodiment, a baseline altitude may be determined at ground level for a location. This baseline altitude may be used to calibrate a barometric pressure sensor on a mobile device. The calibrated barometric pressure sensor can then estimate changes in altitude relative to ground level based on detected pressure differentials, allowing a relative altitude to ground to be determined. This relative altitude can be used to assign a Z-axis coordinate to a relevant location. The Z-axis coordinate may be a ground-relative height or distance estimate for the location. If specific details of a building or structure associated with a location can be determined, an estimated floor may be determined within the building or structure based on the determined relative altitude. The altitude used to baseline the barometric sensor may be determined by selecting an altitude provided by one of multiple altitude sources or based on a combination of multiple sources.

In various embodiments, baseline calibration for the barometric sensor may be a one-time calibration activity, a one-time activity with periodic fine-tuning, or an ongoing activity, with the sensor being calibrated and re-calibrated on a regular basis. Baseline calibration can also be performed for multiple locations, with different locations having different baseline calibration values. Calibration is performed to determine an average ambient ground-level barometric pressure for a given location or group of locations. Various algorithms and heuristics may be used to determine the appropriate time to calibrate the pressure sensor. The algorithms and heuristics enable a mobile device to determine the likelihood that the mobile device is outdoors and at ground level. Based in this determined likelihood, the mobile device can determine the appropriate time to perform a barometric pressure sensor calibration.

In one embodiment, the barometric pressure sensor calibration includes gathering one or more pressure sensor readings from a barometric pressure sensor on a mobile device, filtering or processing the one or more readings to remove noise or outlier readings and/or average or aggregate multiple readings. The filtered or processed pressure readings can then be stored as the ground level pressure reading for a location. A determined ground level altitude (e.g., via GPS, DEM) can also be associated with the stored ground level pressure reading. The ground level pressure reading and associated altitude can then be used to determine an altitude for nearby locations based on pressure readings gathered by the mobile device at those locations.

In one embodiment, altitude information for a location of relevance to a user may be provided, in addition to other location data or metadata, when a user makes an emergency phone call to an emergency call center. Location data, including altitude information determined for the location of the users, may be encrypted and stored on a server that is accessible to an emergency service provider. As a significant number of emergency calls are made from the home or work location of the user, or from another location of particular relevance to the user, it is valuable to be able to provide a Z-axis coordinate, in addition to a latitude and longitude coordinate, when a user makes an emergency call from a location of relevance to the user.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2021 Apple Inc.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and one or more wireless accessory devices. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 140, a media service 150, a storage service 160, and a device location service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The device location service 170 can enable a user to locate a lost or misplaced device that was, at least at some point, connected to the one or more wired and/or wireless networks 110. The device location service 170 can also be used to facilitate the determination of a device location to facilitate the provision of emergency services to the user of mobile device 102A-102B. Other services can also be provided, including a software update service to update operating system software or client software on the mobile device, as well as asset distribution services that can be used to distribute digital assets to the mobile devices 102A-102B. In one embodiment, the messaging service 140, media service 150, storage service 160, and device location service 170 can each be associated with a cloud service provider, where the various services are facilitated via a cloud services account associated with the mobile devices 102A-102B.

Figure 2:
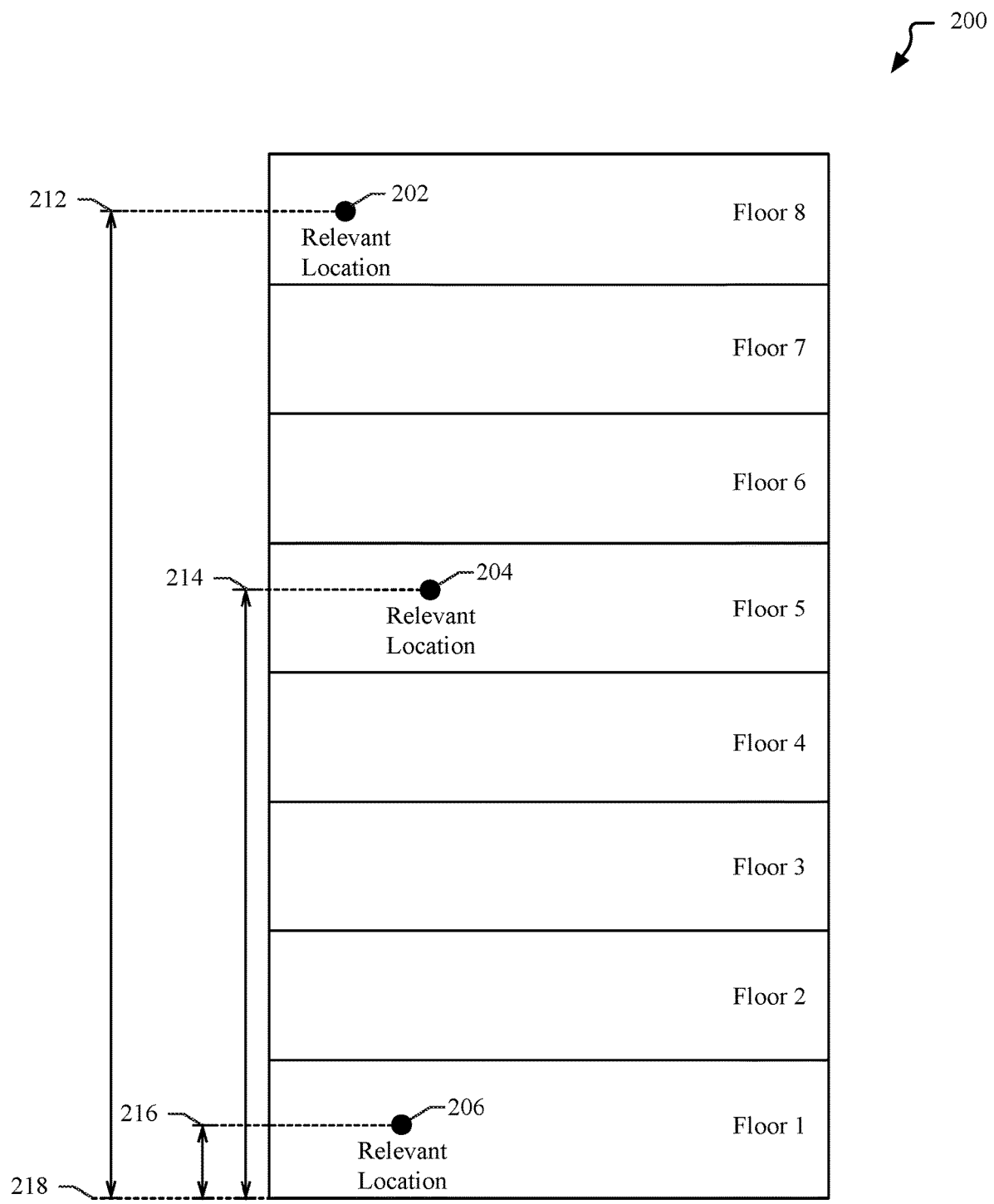
FIG. 2 illustrates multiple relevant locations having similar geographic coordinates.

FIG. 2 illustrates a location environment 200 having multiple relevant locations with similar geographic coordinates. A user of a mobile device 102 (e.g., mobile device 102A-102B as in FIG. 1) may live or work within a multi-floor building having multiple locations that are relevant (e.g., visited, significant, or of interest). The mobile device 102, based on an observed location history associated with the user, may determine multiple relevant locations 202, 204, 206 that are visited by or of interest to the user of the mobile device. The multiple relevant locations 202, 204, 206 may have similar geographic coordinates but are located at different elevations. For example, relevant location 202 may be a home location for the user, while relevant location 204 may be a fitness center that is frequently visited by the user. Relevant location 206 may be a business that is frequently visited by the user and/or may be the work location of the user. The similar geographic coordinates for the relevant locations may make distinguishing between the relevant locations difficult for the device location service system of the mobile device 102 without additional information.

In one embodiment, the relevant locations may be distinguished based on the altitude, elevation, or Z-axis coordinate associated with each location. Relevant location 202 can be associated with altitude value 212. Relevant location 204 can be associated with altitude value 214. Relevant location 206 may be associated with altitude value 216, where altitude value 216 is similar to a ground level altitude value 218. The altitude values may be represented as an altitude value that is relative to the ground level altitude value 218, or may be relative to sea-level altitude. Various techniques may be used to determine the altitude values for each location. In one embodiment the altitude values are determined based on a pressure differential as determined by a barometric pressure sensor included within the mobile device 102 of the user. The barometric pressure sensor of the mobile device 102 may be calibrated to associated pressure readings at the ground level altitude, with altitude values determined via, for example, DEM or satellite sources. The pressure differential between ground level and the relevant locations 202, 204, 206 may then be used to determine a relative or absolute altitude or elevation for each location. Multiple altitude estimates may be aggregated over time to refine the altitude estimate for the location.

Figure 3A:
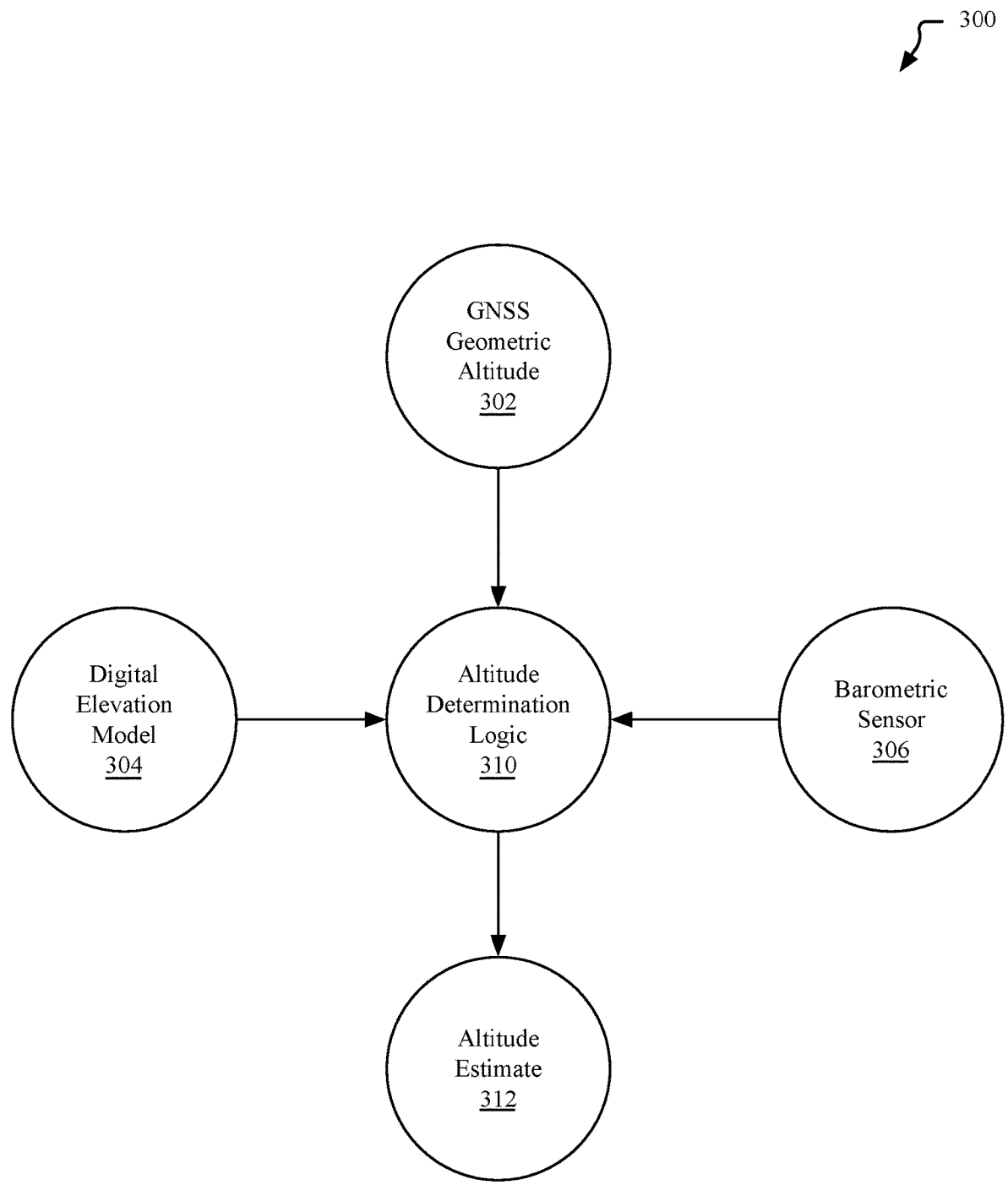
FIG. 3A-3B illustrates a system to determine an altitude estimate for a location based on a cluster of altitude estimates from multiple sources.
Figure 3B:
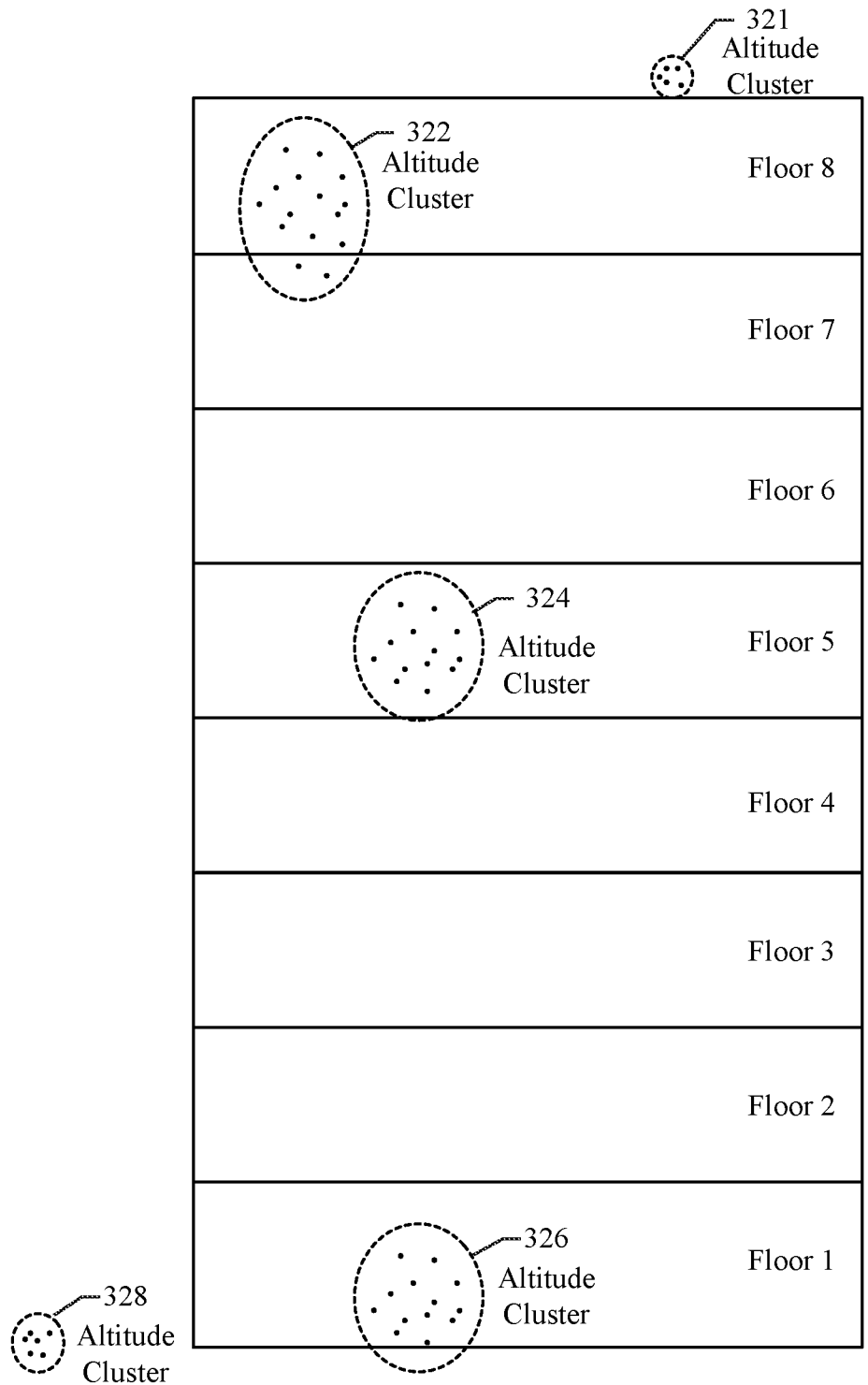

FIG. 3A-3B illustrates a system to determine an altitude estimate for a location based on a cluster of altitude estimates from multiple sources. FIG. 3A illustrates a system 300 to determine an altitude estimate for a location from multiple sources. FIG. 3B illustrates generation of location clustering using system 300.

System 300 of FIG. 3A may be a location services subsystem on a mobile device that includes altitude determination logic 310 in the form of software or firmware logic that executes on a processor or microcontroller of a mobile device 102 as described herein. The altitude determination logic 310 can receive data from data sources that include a digital elevation model 304, GNSS geometric altitude 302, and a barometric sensor 306 and compute an altitude estimate 312 for a location. Other altitude sources may also be available.

In one embodiment the digital elevation model 304 and GNSS geometric altitude 302 can be used to determine an altitude estimate that is used to calibrate a pressure altimeter that is based on data from the barometric sensor 306. When a location is determined or estimated to be at ground level, the altitude for the location can be determined via the digital elevation model 304, if available for the location, and/or GNSS geometric altitude 302. The ground level altitude can be used to calibrate the barometric sensor 306. A baseline pressure can be gathered using the barometric sensor 306. The determined pressure and ground level altitude can be stored in association with location in which the altitude and pressure were determined. Pressure differentials between the baseline barometric pressure and the pressure at a nearby location can be used to determine a relative altitude or elevation above ground level for the nearby location. The ground level altitude can be used with the relative altitude to determine an absolute altitude.

The determined location can have an associated uncertainty value that is based on part on the source of the altitude and one or more source-specific accuracy parameters. For example, an altitude determined via the digital elevation model 304 can have an uncertainty with a value set in part based on the source of the altitude being the digital elevation model 304 and in part based on the resolution of the digital elevation model 304 at the specific location. An altitude determined based on the GNSS geometric altitude 302 can have an altitude value set in part based on the source of the altitude being the GNSS geometric altitude 302 and in part based on the number of satellites in view and the vertical and/or horizontal accuracy associated with the location and altitude determination. An altitude determined in part based on the barometric sensor 306 can have an uncertainty based on, for example the stability of the one or more pressure readings used to determine the altitude estimate, or, for example, the degree to which the pressure reading may be influenced by local weather patterns.

In one embodiment, an altitude for a location is estimated by the system 300 in response to detection of an end to a visit to a location. An end to a visit to a location can be detected when the mobile device leaves a location that the mobile device has dwelled for at least a threshold amount of time. Altitude can be estimated using each available altitude source at the end of the visit. A combined altitude estimate can be generated based on the uncertainty associated with each altitude source. For example, a weighted average may be computed in which altitude sources having a low uncertainty are weighted higher than sources having higher uncertainty. The weighted average can be stored in association with a location. Over time, multiple location and altitude measurements can be gathered and clustered to determine the highest probability geometric and Z-axis coordinates for the location.

FIG. 3B shows how system 300 can use clustering algorithms to determine the highest probability geometric and Z-axis coordinates for the location. Multiple location and altitude measurements can be gathered over time and stored in a location and altitude database. In one embodiment a location and altitude measurement may be gathered opportunistically whenever the operating system or an application of the mobile device requests a device location for another purpose. Various analysis techniques and algorithms (e.g., regularization, normalization, etc.) can be applied to process the data set. Algorithms, such as an Expectation Maximization algorithm, can be applied to recognize and group clusters of data points. The clusters of data points can be recognized as being associated with a visited location or location of interest. A weighted average of the altitude estimates within a cluster can be calculated to determine an altitude to associate with the visited location or location of interest. The uncertainty of each altitude data point can be used to determine weights used for the weighted average. The number of locations that are relevant to a user can be determined based on the number of clusters that are recognized within the data, with each cluster potentially being associated with a location of interest to the user.

For example, analysis of a location and altitude database can result in the recognition of altitude cluster 321, altitude cluster 322, altitude cluster 324, altitude cluster 326, and altitude cluster 328. Altitude cluster 328 may be a ground level location having a tightly clustered set of locations and altitudes with relatively low uncertainty due to the presence of DEM data for the location associated with altitude cluster 328 and the presence of relatively accurate GNSS location and altitude data. Altitude cluster 321 may be a location on the roof of a building, such as a rooftop garden, for which highly accurate GNSS location and altitude data is present, as well as reasonably accurate pressure altitude data. The relatively accurate location and altitude data for altitude cluster 321 may also result in a tightly clustered set of locations and altitudes. Altitude cluster 322, altitude cluster 324, and altitude cluster 326 may be more widely spaced in location and altitude due to GNSS signal attenuation that occurs when in an indoor location and pressure altitude variance due to, for example, an HVAC system within the building. The GNSS signal attenuation and pressure fluctuations may result in higher uncertainty for each altitude and/or location determination. Notwithstanding the wider cluster, specific coordinates can be determined for a location associated with the altitude clusters 322, 324, 326 via a weighted average of the points of the cluster. A specific altitudes can then be associated with a visited location or location of interest that based on the weighted points of the cluster. The raw data used for clustering can be maintained and updated over time. Re-clustering can be performed to generate an updated altitude for a location.

In the event that a user does not define significant locations, such as a home or work location, location clusters can be used to estimate a home and/or work location for a user. An altitude estimate can also be determined for an estimated home or work location. A significant location for a user can be estimated in part based on the duration in which a user spends at a location, the frequency that a user may be found at the location, and the times in which a user may be found at a location. An altitude can then be determined for each significant location of a user and added to location services information for the user. If specific details of a building or structure associated with a location can be determined, an estimated floor may be determined within the building or structure based on the determined relative altitude.

Figure 4:
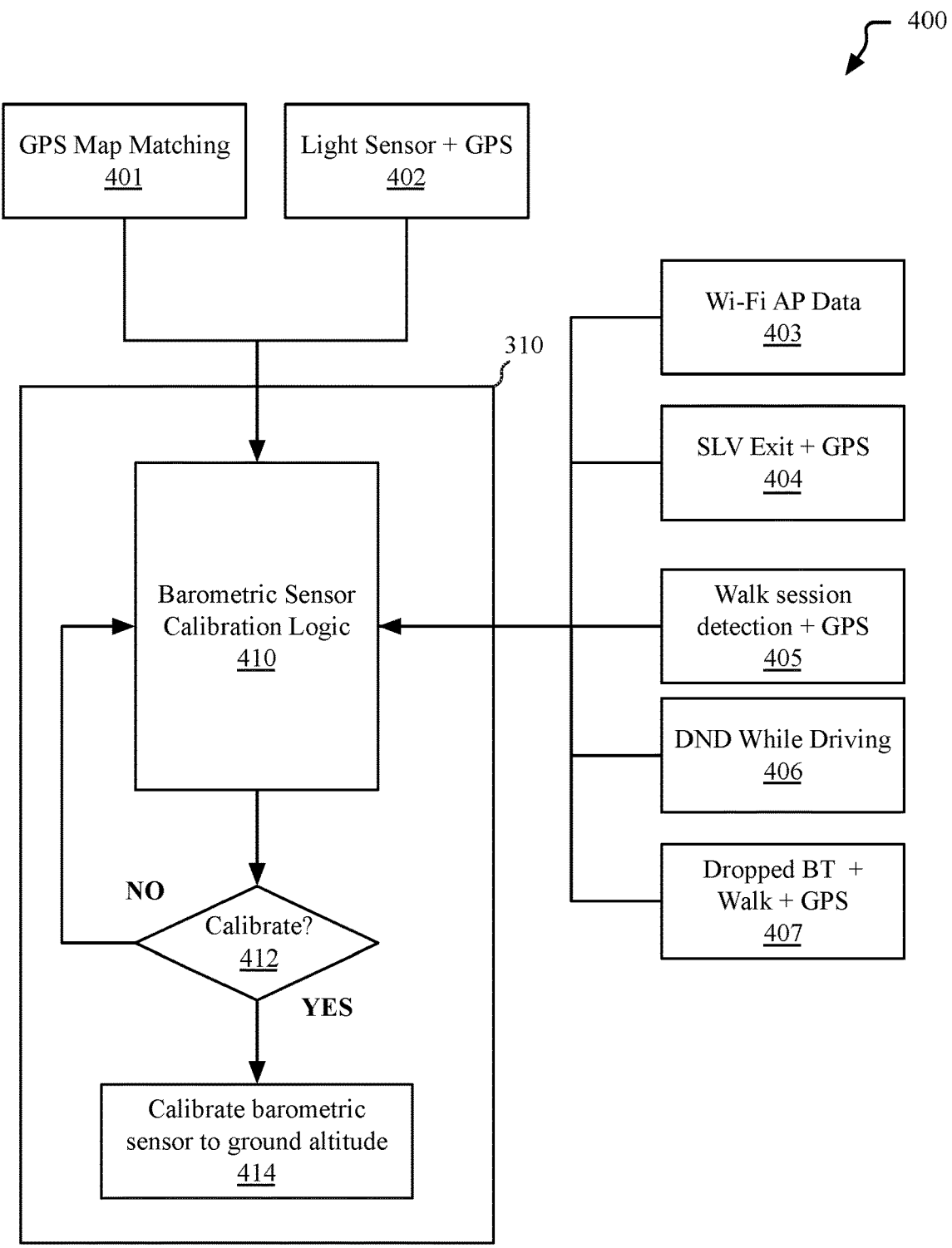
FIG. 4 illustrates a system to calibrate a barometric pressure sensor of a mobile device.

FIG. 4 illustrates a system 400 to calibrate a barometric pressure sensor of a mobile device. In system 400, the altitude determination logic 310 of FIG. 3A includes barometric sensor calibration logic 410, which can analyze input signals that are determined based on multiple scenarios. A method can be performed by the barometric sensor calibration logic to combine a set of input signals to use as a calibration signal. The calibration signal is used to determine the appropriate time to calibrate the barometric pressure sensor within the mobile device. The input signals can be combined, for example, via a hidden Markov model to determine whether the combination of signals suggest that the current time is an opportune time to calibrate the barometric pressure sensor (412). The opportune time can be, for example, when combination of signals suggests that a user is at outdoors and at ground level. When the opportune time to calibrate the barometric pressure sensor is detected ("YES", 412), the altitude determination logic 310 can calibrate the barometric sensor to a determined altitude (414), where an altitude determined via DEM and/or GNSS can be presumed to be the ground level altitude. Calibration can include storing the determined altitude with a pressure reading gathered via the sensor at the time of calibration.

In one embodiment a signal can be generated based on a scenario 401 involving GNSS map matching, which includes detection of an event in which a user has engaged a maps navigation session. The maps navigation session can include a pedestrian navigation setting in which a mobile device configured to provide walking directions, or a vehicle navigation session in which a mobile device is providing turn-by-turn navigation directions while on a roadway. The presence of such scenario may be a very strong indication that the mobile device is outdoors and at least close to ground level.

A signal can also be generated based on a scenario 402 involving a combination of an ambient light sensor and GNSS data. An ambient light sensor can be configured, in addition to detecting light levels, to detect the specific combination of electromagnetic radiation frequencies associated with unattenuated sunlight. When sunlight is detected, a secondary GNSS receiver check can be performed to determine the signal strength of signals received from visible navigation satellites. The combination of sunlight detection and a low attenuation GNSS signal can be a strong indication that the mobile device is outdoors and at ground level.

A signal can also be generated based on a scenario 403 involving a Wi-Fi access point data. A mobile device may be determined to be at ground level, outdoors, and on or within a moving vehicle based on the different Wi-Fi access points that are detected during each Wi-Fi scan. The changing Wi-Fi access points can be used as an alternate indicator that a user is moving over ground within a vehicle in the event that the user is a passenger of a vehicle or driving the vehicle without using mapping or navigation applications. Wi-Fi access point data can also include the presence of, or association with, a specific Wi-Fi access point instead of or in addition to detecting different Wi-Fi access points during successive scans. For example, if a vehicle includes a Wi-Fi access point, the associating with or detecting the presence of that Wi-Fi access point may suggest that the user is within or near that vehicle. Additionally dissociation from a Wi-Fi access point may be a signal. For example, if the mobile device becomes disassociated from a home Wi-Fi access point following a period of decreasing signal strength of that Wi-Fi access point, the mobile device may be presumed to have left home.

A signal can also be generated based on a scenario 404 involving detection of an exit from a significant location visit and GNSS signals detected upon exit. An exit from a significant location visit can be detected by the mobile device upon exit from a geofence associated with a significant location. Upon exit from the significant location, a GNSS receiver can be activated to determine a precise user location. The signal strength of the GNSS signal can be used to influence an estimate of whether the mobile device is outdoors and at ground level. Exits from other locations (e.g., standard location, location of interest) may also be used as triggers to activate GNSS.

A signal can also be generated based on a scenario 405 involving walk session detection and GNSS signals during the walk session. When accelerometers of a device that are configured to perform automatic work-out detection detect that a user is exercising via walking or running, GNSS signals can be used to determine the distance that the user is covering. The strength of the GNSS signals can be used to determine whether it is likely that the user is walking or running outdoors.

A signal can also be generated based on a scenario 406 involving the engagement of a don-not-disturb (DND) while driving feature. When a DND while driving feature is engaged, incoming phone calls and text messages to a mobile device may be muted. DND while driving may be engaged automatically if the mobile device detects that it is in a moving vehicle.

A signal can also be generated based on a scenario 407 involving a dropped Bluetooth connection, followed by a walking session detection. For example, if a user disconnects from a Bluetooth radio of a vehicle and begins walking, it is likely that the user has recently exited a vehicle. GNSS signal strength can be sampled to determine if the user is outdoors. DEM altitude data can be compared with GNSS geometric altitude data to determine if a user is at or near ground level.

As noted above, each of the described signals can be combined to determine whether the current time is an opportune time to calibrate the barometric pressure sensor. The calibrated barometric pressure sensor can then be used as an additional altitude determination source, for locations in which GNSS signals are weak or nonexistent and the ground level altitude for a location is not the accurate altitude for a location within a multi-floor structure.

Figure 5A:
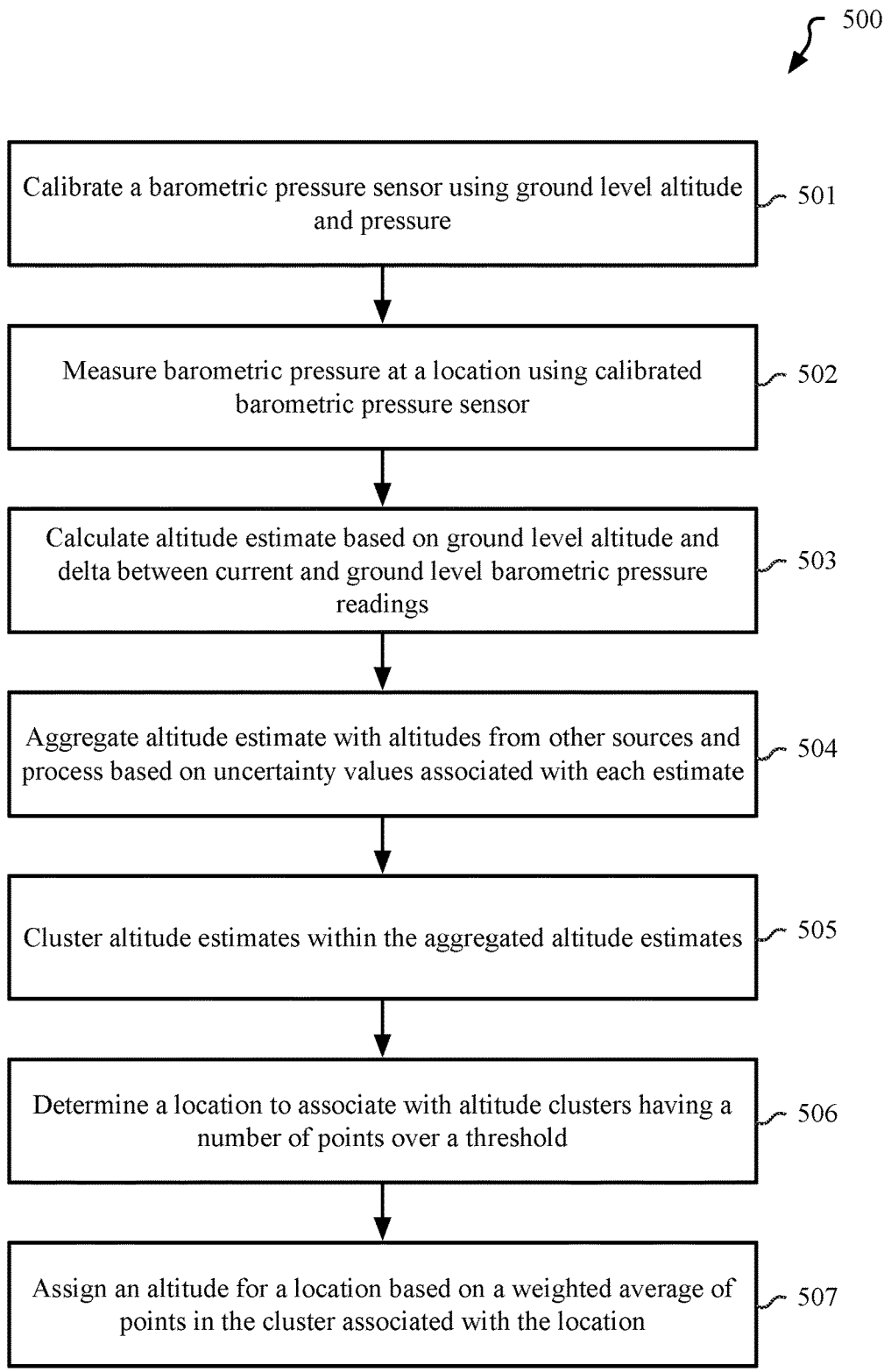
FIG. 5A-5B illustrates methods to determine an altitude estimate for a location using a calibrated barometric pressure sensor of a mobile device.
Figure 5B:
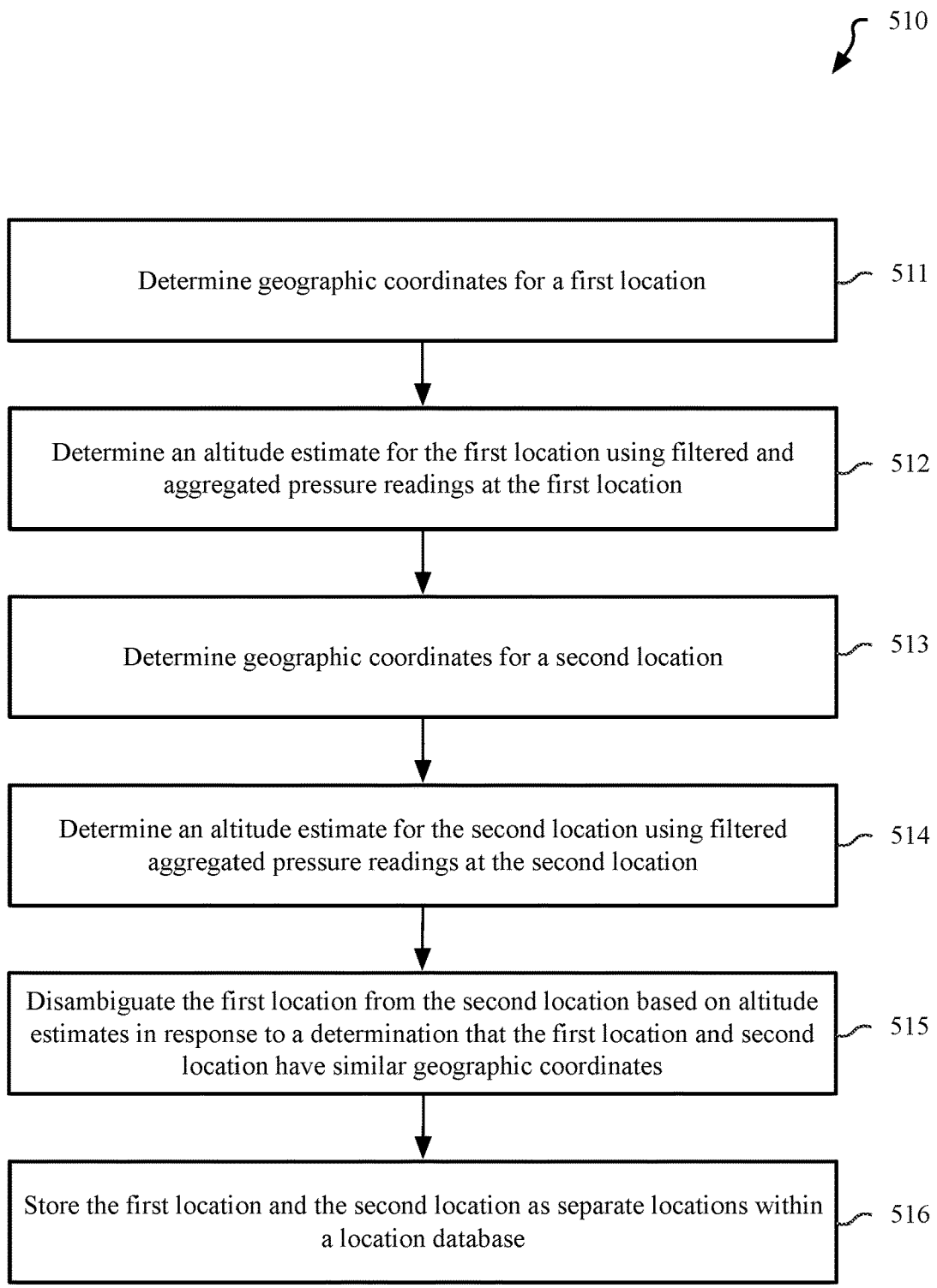

FIG. 5A-5B illustrates methods 500, 510 to determine an altitude estimate for a location using a calibrated barometric pressure sensor of a mobile device. FIG. 5A illustrates method 500 to determine an altitude for a location. FIG. 5B illustrates a method 510 to disambiguate multiple locations having similar geographic coordinates based on different altitudes detected for the location.

As shown in FIG. 5A, method 500 includes performing an operation to calibrate a barometric pressure sensor of a mobile electronic device using ground level altitude and pressure (501). The operation to calibrate the barometric pressure sensor can be performed as illustrated in FIG. 4 by combining various input signals that are generated based on various device scenarios. The calibration can be performed periodically on a regular basis, or based on a change in environmental details, such as a change in weather or a change in temperature. The calibration can be used to determine a baseline altitude and pressure for the location in which the calibration is performed.

Method 500 additionally includes performing an operation to measure barometric pressure at a significant location using the calibrated barometric pressure sensor (502). The mobile device can then calculate an altitude estimate based on a calibration ground level altitude and the delta between the location and ground level barometric pressure readings (503). The calculated altitude can be an absolute or relative altitude. In some scenarios, the calculated altitude can be translated to an estimate of the floor of the structure that includes the location. The pressure reading and altitude calculation can be performed when the mobile device is determined to have left a location in which the mobile device has dwelled for a period of time.

Method 500 additionally includes performing an operation to aggregate the altitude estimate with altitudes from other sources and to process those locations based on uncertainty values associated with each estimate (504). Other altitude sources may be a GNSS geographic altitude if GNSS signals are available at the location. DEM altitudes, if available, may be relevant as a boundary check for an above or below ground location but may not be directly relevant as an altitude for such location. The mobile device can then cluster altitude estimates within the aggregated altitude estimates to detect clusters of altitude estimates (505). Various clustering algorithms can be used, such as but not limited to Expectation Maximization. The clusters of altitude estimates can be used to detect multiple stacked locations having similar latitude and longitude coordinates. The mobile device can then determine a relevant location for altitude clusters having a number of points over a threshold (506). After a location is associated with an altitude cluster, an altitude for the location can be stored based on a weighted average of points in the cluster associated with the location (507).

As shown in FIG. 5B, a mobile device, a mobile device can initiate method 510 by performing an operation to determine geographic coordinates for a first location (511). The mobile device can then determine an altitude estimate for the first location using filtered and aggregated pressure readings at the first location (512). The mobile device can also determine geographic coordinates for a second location (513). The mobile device can then determine an altitude estimate for the second location using filtered aggregated pressure readings at the second location (514). The mobile device can disambiguate the first location from the second location based on altitude estimates when the first location and second location have similar geographic coordinates (515). The mobile device can then store the first location and the second location as separate locations within a location database (516). The location database can be a location database of a location services subsystem of the mobile device. The location database can store visited locations, locations of interest, significant locations, and/or other locations that are or relevance to the user of the mobile device based on detected locations in which the user has dwelled for a least a threshold period of time.

Figure 6:
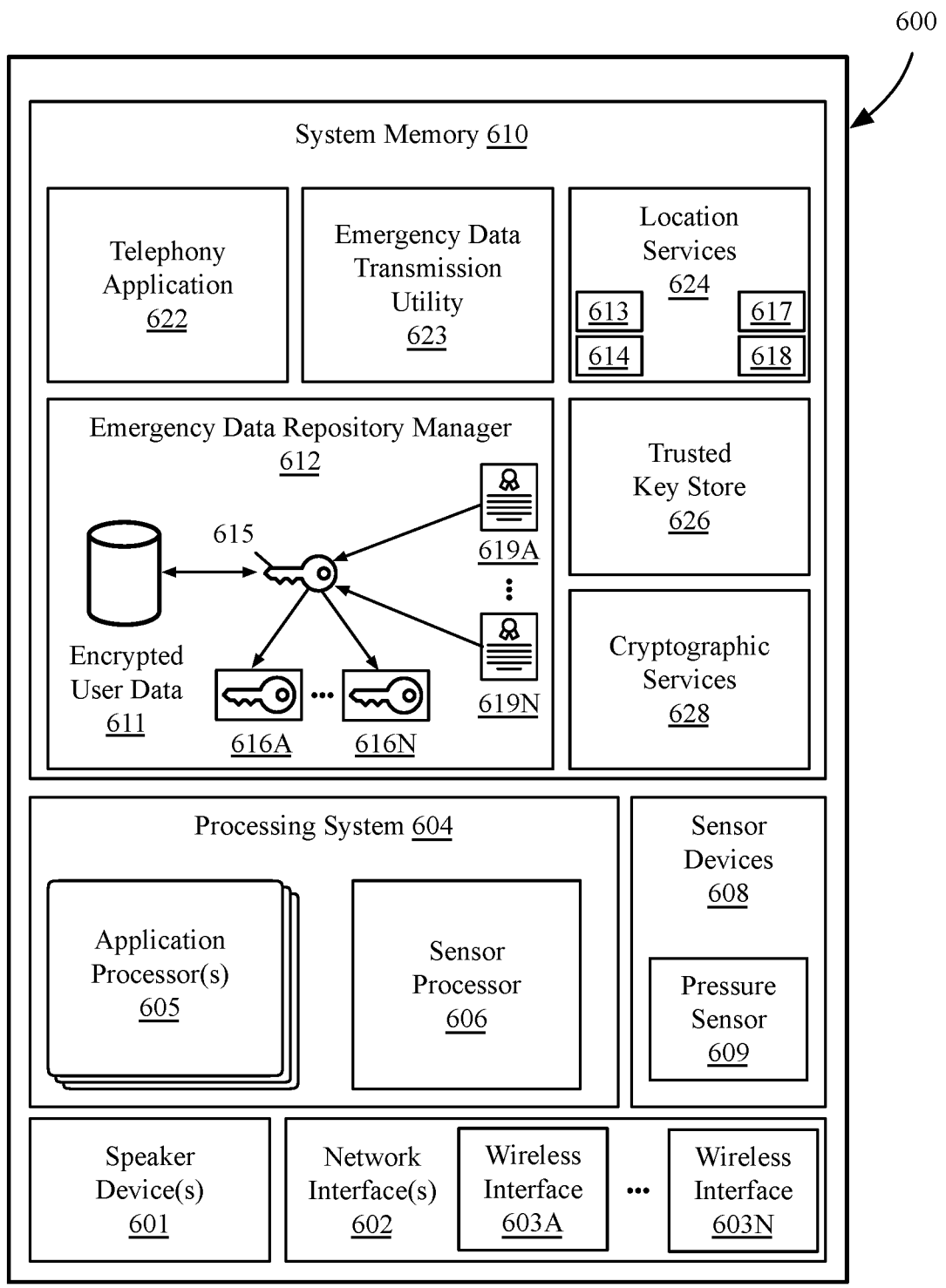
FIG. 6 illustrates a client system architecture to enable the secure provision of location and altitude data to an emergency service provider.

FIG. 6 illustrates a client system architecture 600 to enable the secure provision of location and altitude data to an emergency service provider. The mobile device 102 can include one or more speaker devices 601 to enable playback of the audio portion of media, alarms, alerts, notifications, or telephone calls played on or performed by the mobile device 102. The mobile device 102 also includes one or more network interfaces 602, which can include one or more wireless interfaces 603A-603N to enable wireless network connectivity. The one or more wireless interfaces 603A-603N can couple with baseband processing logic that provides support for wireless networking protocols such as, but not limited to Bluetooth, Wi-Fi, near field communication (NFC), other wireless networking technologies. In some implementations, the network interface 602 may also support a wired network connection.

The computing device also includes a processing system 604 having multiple processor devices. In one embodiment the processing system 604 includes one or more application processor(s) 605 to execute instructions for user and system applications that execute on the computing device. The processing system can also include a sensor processor to process and monitor a suite of sensor devices 608 having sensors including, but not limited to motion sensors, light sensors, proximity sensors, biometric sensors, audio sensors (e.g., microphones), and image sensors (e.g., cameras). The sensor devices 608 can also include a pressure sensor 609, such as a barometric pressure sensor as described herein. The sensor processor 606 can enable low-power monitoring of always-on sensors within the suite of sensor devices 608. The sensor processor 606 can allow the application processor(s) 605 to remain in a low power state when the mobile device 102 is not in active use while allowing the mobile device 102 to remain accessible via voice or gesture input to a virtual assistant or to incoming network data received via the network interface 602.

In one embodiment the mobile device 102 includes a system memory 610 which can be a system virtual memory having an address space that includes volatile and non-volatile memory. The system memory 610 can include a telephony application 622, an emergency data transmission utility 623, and location services logic 624. The telephony application 622 enables the mobile device 102 to contact an emergency service provider. The emergency data transmission utility 623 facilitates the transmission of emergency data from the mobile device 102, such as but not limited to an encrypted data repository including location and/or health data. The location services logic 624 provides a locations services subsystem that enables software logic to query current and historical location data for the mobile device 102. The location services logic 624 can be associated with an operating system of the mobile device 102. The location services logic 624 enables operating system and application logic to request a location of the mobile device 102. The location of the mobile device 102 can be determined via a GNSS system or a wireless positioning system, such as a Wi-Fi positioning system or a wireless positioning system based on cellular or mobile/data base stations. The location services logic 624 can include a mapping engine/database 613, a location database 614 to store relevant locations and altitudes associated with those locations, a DEM database 617, and altitude determination logic 618, which may be the altitude determination logic 310 of FIG. 3A and FIG. 4. In one embodiment the DEM database 617 is incorporated into the mapping engine/database 613.

The system memory 610 can also include an emergency data repository manager 612. The emergency data repository manager 612 can facilitate the encryption of user data into encrypted user data 611. The emergency data repository manager 612 can also facilitate the generation of encryption keys 616A-616N to encrypt data in a manner that may be decrypted by emergency service providers. In one embodiment a key derivation function 615 may be used to generate encryption keys 616A-616N based on keys provided via public certificates 619A-619N of the emergency service providers. The public certificates 619A-619N can include a certificate chain that facilitates the evaluation of the public certificates, all the way up to a CA root key that is stored in a trusted key store 626 of the mobile device 102. Encryption operations performed by the emergency data repository manager 612 can be assisted or accelerated by a cryptographic services library 628 that is stored in system memory 610. The cryptographic services library 628 can provide encryption primitives that are accelerated using cryptographic engines within the mobile device.

Figure 7:
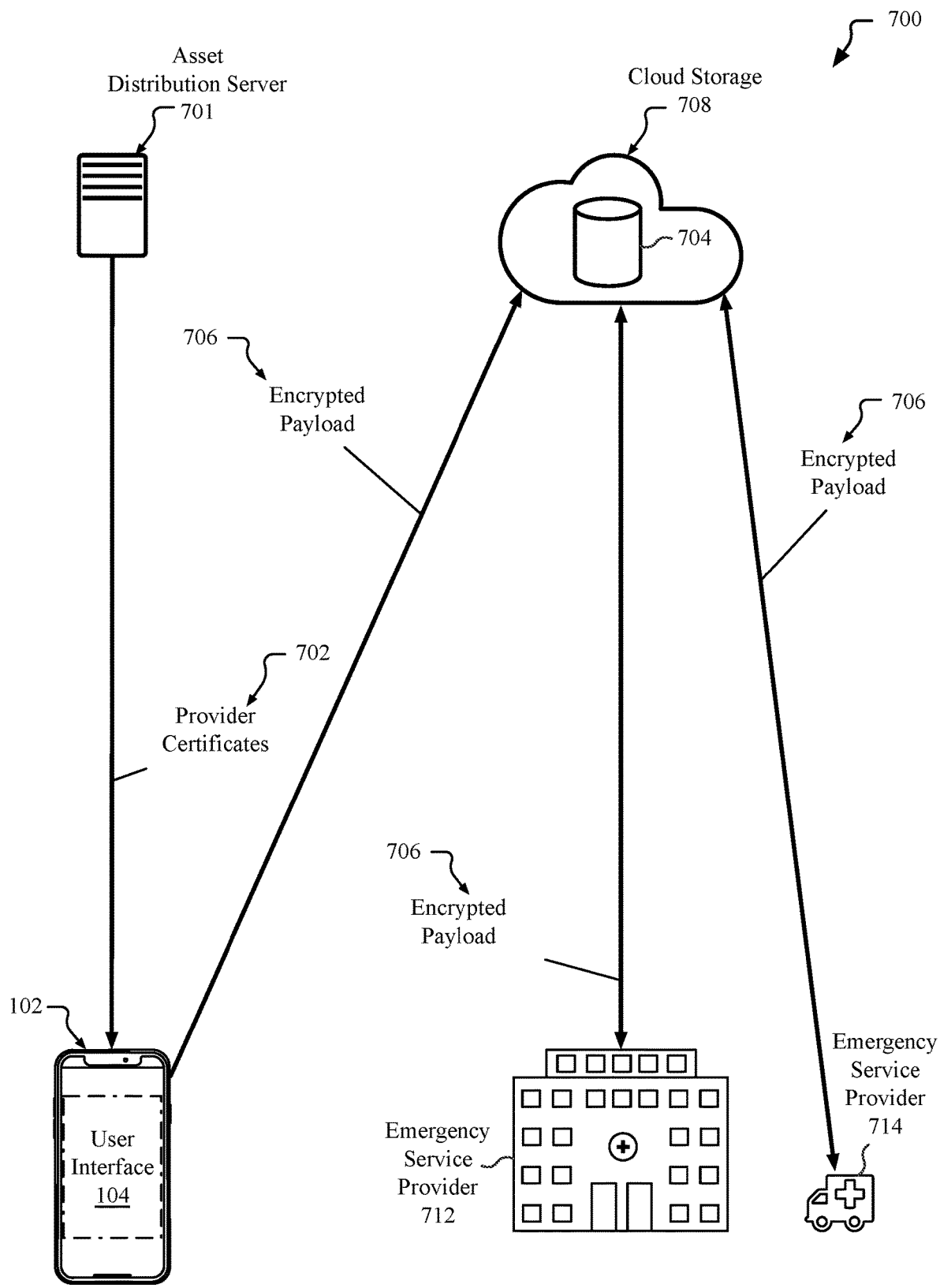
FIG. 7 illustrates a network system to enable the secure provision of location and altitude data to an emergency service provider.

FIG. 7 illustrates a network system 700 to enable the secure provision of location and altitude data to an emergency service provider. In one embodiment a mobile device vendor, or a service provider associated with the mobile device vender, provides an asset distribution server 701 that stores digital assets to be distributed to mobile devices. The asset distribution server 701 can provide an asset distribution mechanism that enables provider certificates 702 associated with an emergency service providers 712, 714 to be distributed to a mobile device 102. Each of the provider certificates 702 can be provided to the asset distribution server 701 by an emergency service provider 712, 714. The provider certificates 702 may also be provided to the asset distribution server 701 by another party on behalf of the emergency service provider 712, 714. Each emergency service provider 712, 714 provides a separate certificate or a common certificate may be used. The provider certificates 702 may be publicly trusted certificates that contain a certificate chain that allows evaluation of the validity of the certificate. The certificate chain can of each certificate can be evaluated through to a certificate authority root certificate that may be stored in a trust store on the mobile device 102. The provider certificates 702 can each specify a public key of a public/private key pair associated with an emergency service provider 712, 714.

The mobile device 102 can initiate contact with an emergency service provider 712, 714, for example, via the user interface 104 of the mobile device or via another technique to initiate an emergency call. Upon the mobile device 102 initiating contact (e.g., via a phone call) with an emergency service provider 712, 714, the mobile device can derive cryptographic material that includes an encryption key k and an initialization vector $IV_1$. The cryptographic material may be used to encrypt a payload to generate an encrypted payload 706. The encrypted payload 706 can include sensor data associated with user that is gathered by the mobile device 102 and/or accessories coupled with the mobile device 102. The encrypted payload 706 can include, for example, health data gathered by the mobile device 102 or a wearable electronic device associated with the mobile device 102. The encrypted payload 706 can also include a current geographic location determined for the mobile device 102, including an altitude associated with the geographic location. The encrypted payload 706 can be stored to a data repository 704 within a cloud storage server 708. In other implementations, instead of sending the current geographic location as determined by the mobile device 102 in the encrypted payload 706, identifying information for a location information server (LIS) may be transmitted, which enables the emergency service provider 712 to access a location or a location stream for the mobile device 102 that is facilitated by, for example, the device location service 170 as in FIG. 1.

Emergency service providers 712, 714 can download the encrypted payload 706 from the data repository 704. The Emergency service providers 712, 714 can then decrypt the payload using an encryption key k and an initialization vector $IV_1$ derived via the private key of the public/private key pair associated with an emergency service provider 712, 714. Where the user is calling from a multi-floor building, the altitude component of the location data that is sent to the emergency service providers 712, 714 via the encrypted payload 706 can facilitate locating the caller within the building.

Figure 8:
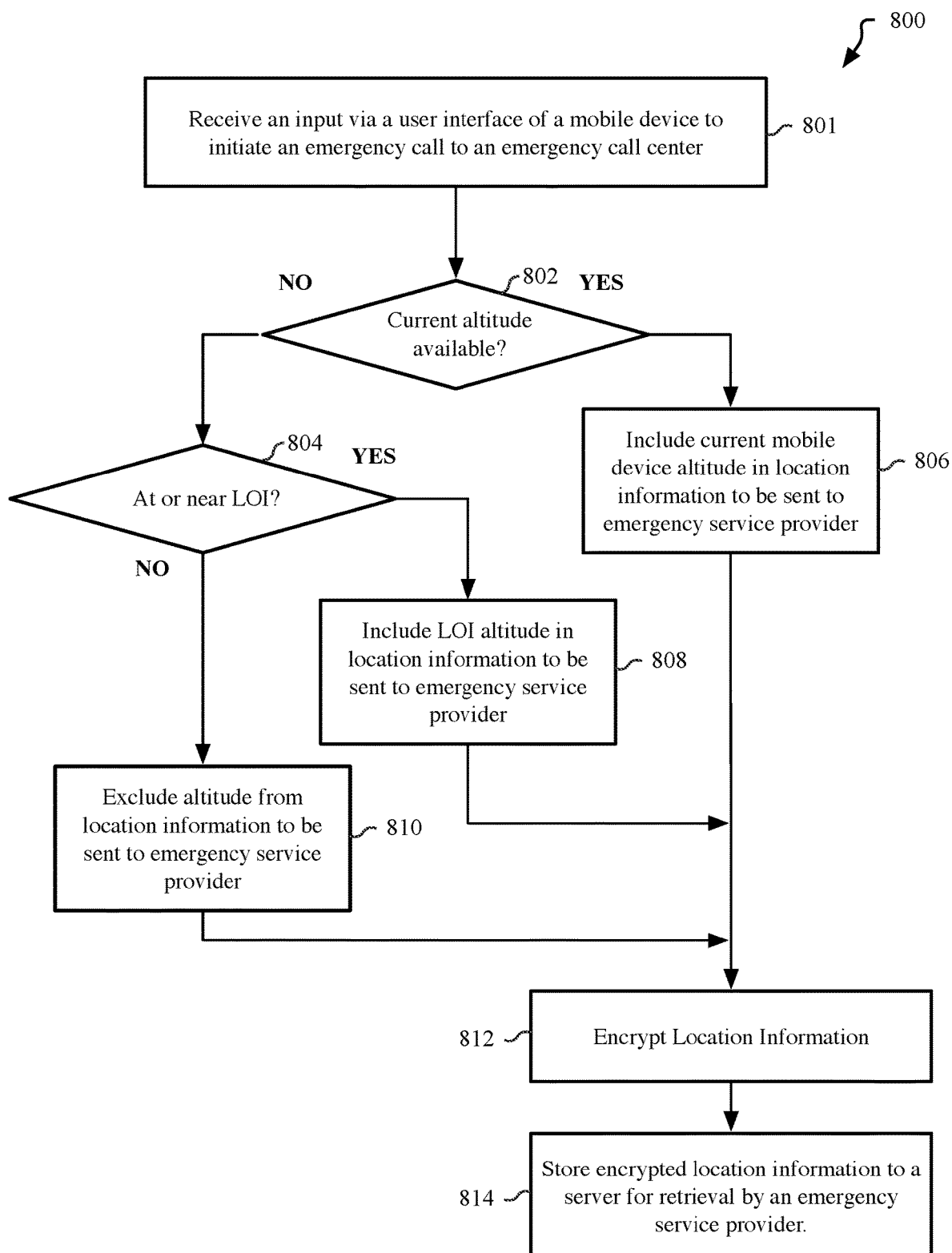
FIG. 8 illustrates a method to enable the secure provision of location and altitude data to an emergency service provider.

FIG. 8 illustrates a method 800 to enable the secure provision of location and altitude data to an emergency service provider. Method 800 includes, on a mobile device, performing an operation to receive an input via a user interface of a mobile device to initiate an emergency call to an emergency call center (801). The mobile device can determine if a current altitude is available for the device (802). If a current altitude is available (YES, 802), the mobile device can include the current altitude in the location information to be sent to the emergency service provider (806). If the current altitude is not available (NO, 802), method 800 includes performing, on the mobile device, an operation to determine if the mobile device is currently at or near a location of interest (804), or any location with a determined altitude. The mobile device can determine that an altitude is not currently available for the mobile device if the uncertainty of a current altitude estimate is above a threshold. If the mobile device is at or near a location of interest (YES, 804), the mobile device can include a previously determined altitude of the location of interest in the location information to be sent to the emergency service provider (808). If the mobile device is not at or near a location of interest (NO, 804), the mobile device can exclude an altitude from the location information to be sent to the emergency service provider (810). The location information, of course, can include a current determined location for the mobile device. The mobile device can then encrypt the location information, which may include an altitude if available (812). The mobile device can then store the encrypted location information to a server for retrieval by an emergency service provider (814).

As an alternative process, an identifier to a device location service may be provided to the emergency service provider to enable location data for the mobile device to be streamed to the emergency service provider. The altitude information that is provided may be an absolute altitude or a relative altitude that is relative to a ground level altitude. The altitude information may also include a translation from an altitude to a floor estimate for the building in which the user is located.

Figure 9:
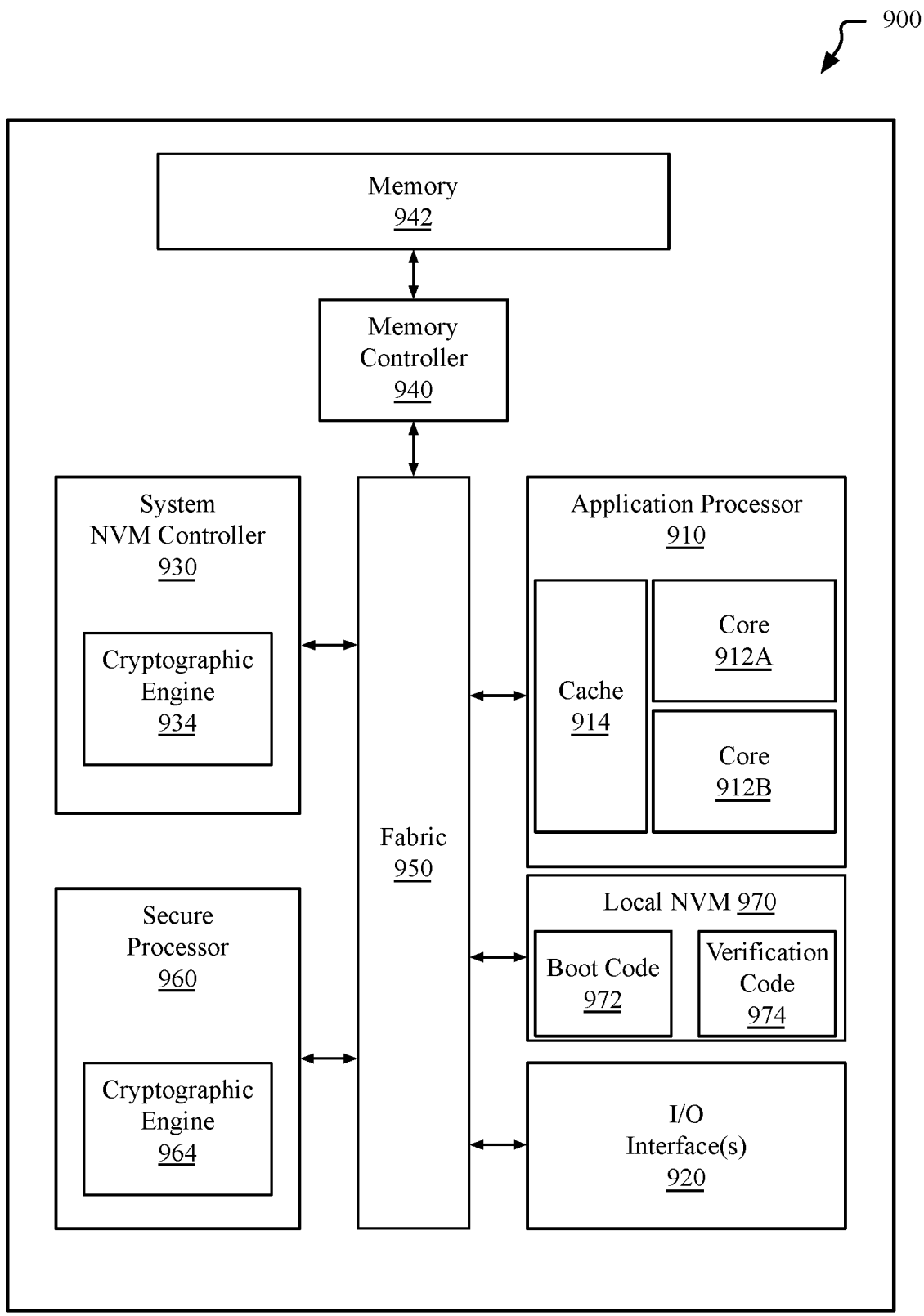
FIG. 9 illustrates an exemplary processing system suitable for the generation of cryptographic material.

FIG. 9 illustrates an exemplary processing system suitable for the generation of cryptographic material. In one embodiment the processing system 900 includes an application processor 910 and an interconnect fabric 950 that enables communication within the processing system 900, although a system bus may also be used in other embodiments. In one embodiment the application processor 910 includes multiple cores 912A-912B and at least one cache 914. The application processor 910 can facilitate execution of various applications on an electronic device, such as a smartphone, table, wearable device, or other electronic devices described herein. The application processor 910 can then securely boot using boot code 972 stored on local non-volatile memory 970, which can be a separate storage device than the primary non-volatile memory of the system, or can be a secure portion of the primary non-volatile memory. The boot code can be accompanied by verification code 974 that can be used verify that the boot code 972 has not been modified.

The processing system 900 also includes a secure processor 960, which can be any secure processor described herein, such as but not limited to a secure enclave processor (SEP), a secure element, or a trusted platform module (TPM). The secure processor 960 includes a secure circuit configured to maintain user keys for encrypting and decrypting data keys associated with a user. As used herein, the term "secure circuit" refers to a circuit that protects an isolated, internal resource from being directly accessed by any external circuits. The secure processor 960 can be used to secure communication with the peripherals connected via the peripheral hardware interface(s) 920. The secure processor 960 can include a cryptographic engine 964 that includes circuitry to perform cryptographic operations for the secure processor 960. The cryptographic operations can include the encryption and decryption of data keys that are used to perform storage volume encryption or other data encryption operations within a system.

The processing system 900 can also include a system non-volatile memory controller 930 that manages primary non-volatile memory of the system. The system non-volatile memory controller can also include a cryptographic engine 934 to enable the real-time encryption and decryption of data stored to the system non-volatile memory. The cryptographic engines 934, 964 may each implement any suitable encryption algorithm such as the Data Encryption Standard (DES), Advanced Encryption Standard (AES), Rivest Shamir Adleman (RSA), or Elliptic Curve Cryptography (ECC) based encryption algorithms.

Each of the application processor 910, secure processor 960 and system non-volatile memory controller 930 described herein may make use of a shared memory 942 that is accessible via a memory controller 940 coupled with the interconnect fabric 950.

Figure 10:
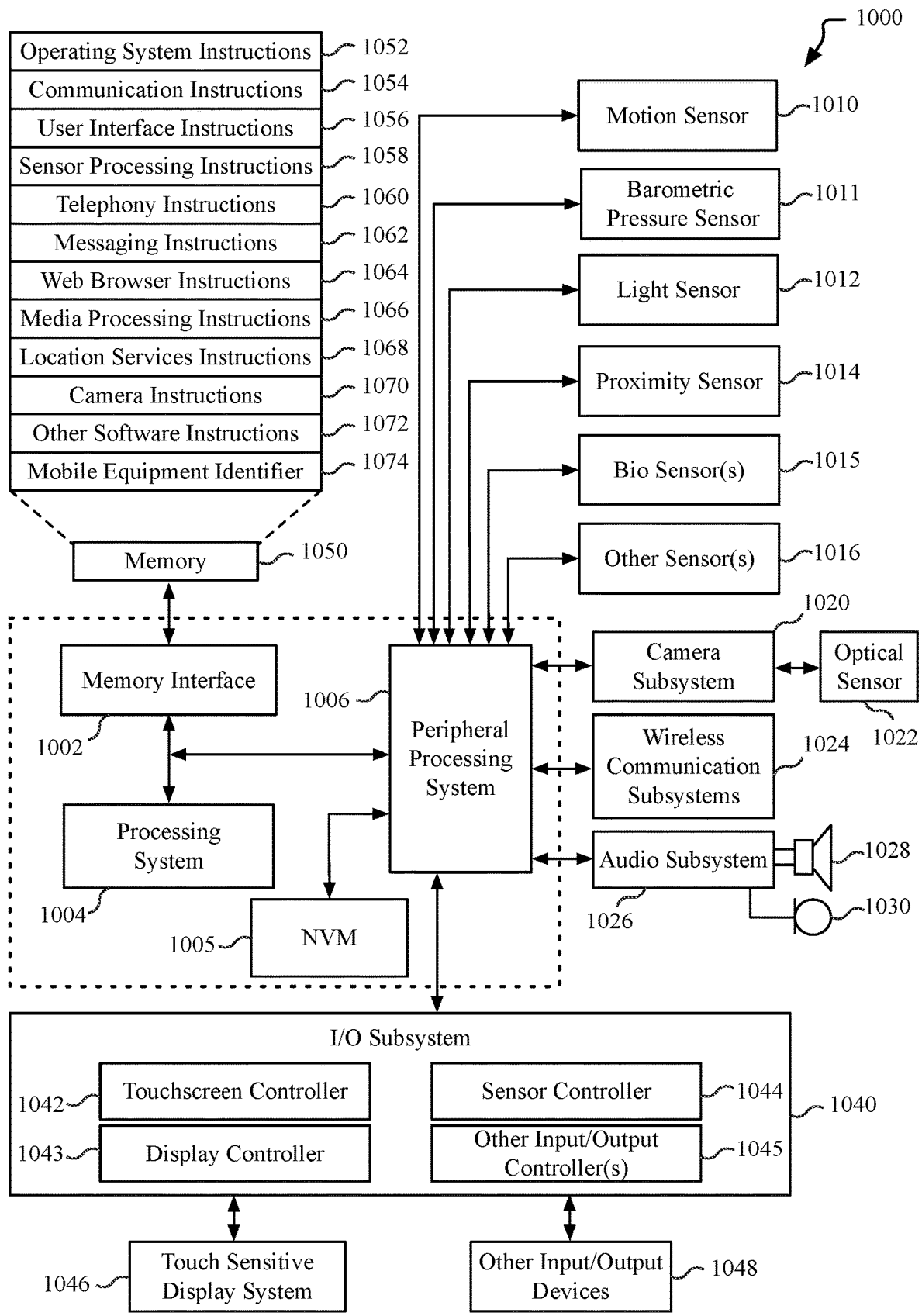
FIG. 10 is a block diagram of a computing device architecture, according to an embodiment.

FIG. 10 is a block diagram of a computing device architecture 1000, according to an embodiment. The computing device architecture 1000 includes a memory interface 1002, a processing system 1004, and a peripheral processing system 1006. The various components can be coupled by one or more communication buses, fabrics, or signal lines. The various components can be separate logical components or devices or can be integrated in one or more integrated circuits, such as in a system on a chip integrated circuit. The processing system 1004 may include multiple processors and/or co-processors. The various processors within the processing system 1004 can be similar in architecture or the processing system 1004 can be a heterogeneous processing system. In one embodiment the processing system 1004 is a heterogeneous processing system including one or more data processors, image processors and/or graphics processing units.

The memory interface 1002 can be coupled to memory 1050, which can include high-speed random-access memory such as static random-access memory (SRAM) or dynamic random-access memory (DRAM). The non-volatile memory 1005 can store runtime information, data, and/or instructions in non-volatile memory devices such as flash memory (e.g., NAND flash, NOR flash, etc.). The connection between the processing system 1004 and memory interface 1002 to the non-volatile memory 1005 can be facilitated via the peripheral processing system 1006.

Sensors, devices, and subsystems can be coupled to the peripheral processing system 1006 to facilitate multiple functionalities. For example, a motion sensor 1010, a barometric pressure sensor 1011, a light sensor 1012, and a proximity sensor 1014 can be coupled to the peripheral processing system 1006 to facilitate the mobile device functionality. Other sensors 1016 can also be connected to the peripheral processing system 1006, such as a positioning system (e.g., GPS receiver), a temperature sensor, a biometric sensor, or other sensing device, to facilitate related functionalities. A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

The peripheral processing system 1006 can enable a connection to communication peripherals including one or more wireless communication subsystems 1024, which can include radio frequency receivers and transmitters and/or optical (e.g., infrared) receivers and transmitters. The specific design and implementation of the wireless communication subsystems 1024 can depend on the communication network(s) over which a mobile device is intended to operate. For example, a mobile device including the illustrated computing device architecture 1000 can include wireless communication subsystems 1024 designed to operate over a network using Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The wireless communication subsystems 1024 can provide a communications mechanism over which a client browser application can retrieve resources from a remote web server. The peripheral processing system 1006 can also enable an interconnect to an audio subsystem 1026, which can be coupled to a speaker 1028 and a microphone 1030 to facilitate voice-enabled functions, such as voice recognition, voice replication, digital recording, and telephony functions.

The peripheral processing system 1006 can enable a connection to an I/O subsystem 1040 that includes a touchscreen controller 1042 and/or other input controller(s) 1045. The touchscreen controller 1042 can be coupled to a touch sensitive display system 1046 (e.g., touchscreen). The touch sensitive display system 1046 and touchscreen controller 1042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1046. Display output for the touch sensitive display system 1046 can be generated by a display controller 1043. In one embodiment the display controller 1043 can provide frame data to the touch sensitive display system 1046 at a variable frame rate.

In one embodiment a sensor controller 1044 is included to monitor, control, and/or processes data received from one or more of the motion sensor 1010, light sensor 1012, proximity sensor 1014, or other sensors 1016. The sensor controller 1044 can include logic to interpret sensor data to determine the occurrence of one of more motion events or activities by analysis of the sensor data from the sensors.

In one embodiment the peripheral processing system 1006 can also enable a connection to one or more bio sensor(s) 1015. A bio sensor can be configured to detect biometric data for a user of computing device. Biometric data may be data that at least quasi-uniquely identifies the user among other humans based on the user's physical or behavioral characteristics. For example, in some embodiments the bio sensor(s) 1015 can include a finger print sensor that captures fingerprint data from the user. In another embodiment, bio sensor(s) 1015 include a camera that captures facial information from a user's face. In some embodiments the bio sensor(s) 1015 can maintain previously captured biometric data of an authorized user and compare the captured biometric data against newly received biometric data to authenticate a user.

In one embodiment the I/O subsystem 1040 includes other input controller(s) 1045 that can be coupled to other input/control devices 1048, such as one or more buttons, rocker switches, thumb-wheel, infrared port, USB port, and/or a pointer device such as a stylus, or control devices such as an up/down button for volume control of the speaker 1028 and/or the microphone 1030.

In one embodiment, the memory 1050 coupled to the memory interface 1002 can store instructions for an operating system 1052, including portable operating system interface (POSIX) compliant and non-compliant operating system or an embedded operating system. The operating system 1052 may include instructions for handling basic system services and for performing hardware dependent tasks. In some implementations, the operating system 1052 can be a kernel or micro kernel-based operating system.

The memory 1050 can also store communication instructions 1054 to facilitate communicating with one or more additional devices, one or more computers and/or one or more servers, for example, to retrieve web resources from remote web servers. The memory 1050 can also include user interface instructions 1056, including graphical user interface instructions to facilitate graphic user interface processing.

Additionally, the memory 1050 can store sensor processing instructions 1058 to facilitate sensor-related processing and functions; telephony instructions 1060 to facilitate telephone-related processes and functions; messaging instructions 1062 to facilitate electronic-messaging related processes and functions; web browser instructions 1064 to facilitate web browsing-related processes and functions; media processing instructions 1066 to facilitate media processing-related processes and functions; location services instructions including GPS and/or navigation instructions 1068 and Wi-Fi based location instructions to facilitate location based functionality; camera instructions 1070 to facilitate camera-related processes and functions; and/or other software instructions 1072 to facilitate other processes and functions, e.g., security processes and functions, and processes and functions related to the systems. The memory 1050 may also store other software instructions such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. A mobile equipment identifier, such as an International Mobile Equipment Identity (IMEI) 1074 or a similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions may be implemented in hardware and/or in software, including in one or more signal processing and/or application specific integrated circuits.

As described herein, where GPS or other satellite-based positioning and/or navigation system is described, any global navigation satellite system (GNSS) or satellite-based positioning system may be used, such as but not limited to the Global Positioning System, Global Navigation Satellite System (GLONASS), BeiDou Navigation Satellite System (BDS), and the Galileo system. Where relevant, regional satellite systems may also be used.

As described above, one aspect of the present technology is the gathering and use of data available from specific and legitimate sources to improve user experience with respect to granting access to protected resources on a data processing system. The present disclosure contemplates that in some instances, this gathered data may include personal information data regarding application usage patterns for a user. The gathering of such application usage patterns may also inadvertently reveal other information that may be used to uniquely identify the user, such as demographic data, location-based data, online identifiers, telephone numbers, email addresses, home addresses, data or records relating to a user's health or level of fitness (e.g., vital signs measurements, medication information, exercise information), date of birth, or any other personal information. The present disclosure recognizes that the use of such personal information data, in the present technology, can be used to the benefit of users, for example, to improve the user experience with performing tasks using a data processing system or computing device described herein.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during system configuration or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services In the foregoing specification, details have been described with reference to specific embodiments. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally various components described herein can be a means for performing the operations or functions described in accordance with an embodiment.

Embodiments described herein provide techniques to enable a mobile device to perform multi-source estimation of an altitude for a location. A baseline altitude may be determined at ground level for a location and used to calibrate a barometric pressure sensor on the mobile device. The calibrated barometric pressure sensor can then estimate changes in altitude relative to ground level based on detected pressure differentials, allowing a relative altitude to ground to be determined. Baseline calibration for the barometric sensor calibration can be performed to determine an ambient ground-level barometric pressure.

One embodiment provides an electronic device comprising one or more memory devices to store instructions and one or more processors to execute the instructions. The instructions are associated with an operating system executed by the one or more processors of the electronic device. The instructions cause the one or more processors to determine, by a location subsystem of the operating system, geographic coordinates for a first location, determine, via the location subsystem, an altitude estimate for the first location, determine, via the location subsystem, geographic coordinates for a second location, determine, via the location subsystem, an altitude estimate for the second location, and disambiguate the first location from the second location based on altitude estimates for the first location and the second location in response to a determination that the first location and the second location have similar geographic coordinates. The electronic device can then store the first location and the second location as separate locations within a location database of the location subsystem. The location database is stored in the one or more memory devices.

In a further embodiment, the electronic device includes a location determination system including a global navigation satellite system and a wireless positioning system. The location subsystem is configured to determine the geographic coordinates based on the location determination system. To determine the altitude estimate for the first location and the second location includes to determine a barometric pressure via a barometric pressure sensor of the electronic device and estimate an altitude based on the barometric pressure. To estimate the altitude based on the barometric pressure includes to compare the barometric pressure with a baseline barometric pressure. The one or more processors can additionally be configured to determine the baseline barometric pressure in response to a calibration signal, the calibration signal to indicate a probability that the electronic device is outdoors and at ground level and associate an altitude determined via a global navigation satellite system or a digital elevation model with the baseline barometric pressure.

In a further embodiment, the one or more processors are additionally to aggregate a first altitude estimate determined for the first location or the second location via the barometric pressure reading with a second altitude estimate determined for the first location or the second location via the global navigation satellite system or the digital elevation model. To aggregate a first altitude estimate with the second altitude estimate includes to determine a weighted average of the first altitude estimate and the second altitude estimate. Weights of the weighted average are determined based on uncertainty values associated with the first altitude estimate and the second altitude estimate. An uncertainty value for an altitude estimate can be determined based on a source of the altitude estimate.

In a further embodiment, the one or more processors are to associate the first location with a first cluster of altitude estimates, associate the second location with a second cluster of altitude estimates, determine a first altitude for the first location based on a first average of altitude estimates within the first cluster of altitude estimates, and determine a second altitude for the second location based on a second average of altitude estimates within the second cluster of altitude estimates.

One embodiment provides a method comprising, on an mobile device having one or more processors to execute instructions associated with an operating system on the mobile device, determining, via a location subsystem of the operating system of the mobile device, geographic coordinates for a first location, determining, via the location subsystem, an altitude estimate for the first location, determining, via the location subsystem, geographic coordinates for a second location, determining, via the location subsystem, an altitude estimate for the second location, and disambiguating the first location from the second location based on altitude estimates for the first location and the second location in response to a determination that the first location and the second location have similar geographic coordinates. The method additionally includes storing the first location and the second location as separate locations within a location database of the location subsystem.

The method can additionally include operations performed by an electronic device or data processing system as described herein. A further embodiment includes a non-transitory machine-readable medium storing instructions which, when executed by one or more processors, cause the one or more processors to perform operations of a method as described herein.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. An electronic device comprising:
one or more memory devices to store instructions; and
one or more processors to execute the instructions, wherein the instructions are associated with an operating system executed by the one or more processors of the electronic device and the instructions cause the one or more processors to:
  detect an interaction with an application configured to provide a navigation session;
  determine a baseline barometric pressure in response to at least one calibration signal that indicates a probability that the electronic device is outdoors and at ground level, wherein the at least one calibration signal comprises the detected interaction with the application;
  determine, by a location subsystem of the operating system, geographic coordinates for a first location;
  determine, via the location subsystem, an altitude estimate for the first location;
  determine, via the location subsystem, geographic coordinates for a second location;
  determine, via the location subsystem, an altitude estimate for the second location, wherein to determine the altitude estimate for the first location and the second location comprises a comparison of a barometric pressure at a location with the baseline barometric pressure;
  disambiguate the first location from the second location based on altitude estimates for the first location and the second location in response to an observed location history of the first location and the second location; and
  store the first location and the second location as separate locations within a location database of the location subsystem, the location database stored in the one or more memory devices.

2. The electronic device as in claim 1, additionally comprising a location determination system including a global navigation satellite system and a wireless positioning system, the location subsystem to determine the geographic coordinates based on the location determination system.

3. The electronic device as in claim 1, wherein to determine the altitude estimate for the first location and the second location includes to:
determine the barometric pressure via a barometric pressure sensor of the electronic device; and
estimate an altitude based on the barometric pressure.

4. The electronic device as in claim 1, wherein the one or more processors are additionally to:
determine the baseline barometric pressure in response to the calibration signal, the calibration signal to indicate a probability that the electronic device is outdoors and at ground level.

5. The electronic device as in claim 4, wherein the one or more processors are additionally to:
associate an altitude determined via a global navigation satellite system or a digital elevation model with the baseline barometric pressure.

6. The electronic device as in claim 5, wherein the one or more processors are additionally to aggregate a first altitude estimate determined for the first location or the second location via the barometric pressure reading with a second altitude estimate determined for the first location or the second location via the global navigation satellite system or the digital elevation model.

7. The electronic device as in claim 6, wherein to aggregate a first altitude estimate with the second altitude estimate includes to determine a weighted average of the first altitude estimate and the second altitude estimate and weights of the weighted average are determined based on uncertainty values associated with the first altitude estimate and the second altitude estimate.

8. The electronic device as in claim 7, wherein an uncertainty value for an altitude estimate is determined based on a source of the altitude estimate.

9. The electronic device as in claim 1, wherein the one or more processors are to:
associate the first location with a first cluster of altitude estimates;
associate the second location with a second cluster of altitude estimates;

determine a first altitude for the first location based on a first average of altitude estimates within the first cluster of altitude estimates; and determine a second altitude for the second location based on a second average of altitude estimates within the second cluster of altitude estimates.

10. A method comprising:

on a mobile device having one or more processors to execute instructions associated with an operating system on the mobile device:

detecting an interaction with an application configured to provide a navigation session;

determine a baseline barometric pressure in response to at least one calibration signal that indicates a probability that the electronic device is outdoors and at ground level, wherein the at least one calibration signal comprises the detected interaction with the application;

determining, via a location subsystem of the operating system of the mobile device, geographic coordinates for a first location;

determining, via the location subsystem, an altitude estimate for the first location;

determining, via the location subsystem, geographic coordinates for a second location;

determining, via the location subsystem, an altitude estimate for the second location, wherein determining the altitude estimate for the first location and the second location comprises a comparison of a barometric pressure at a location with the baseline barometric pressure;

disambiguating the first location from the second location based on altitude estimates for the first location and the second location in response to an observed location history of the first location and the second location; and storing the first location and the second location as separate locations within a location database of the location subsystem.

11. The method as in claim 10, additionally comprising:

associating the first location with a first cluster of altitude estimates;

associating the second location with a second cluster of altitude estimates;

determining a first altitude for the first location based on a first average of altitude estimates within the first cluster of altitude estimates; and determining a second altitude for the second location based on a second average of altitude estimates within the second cluster of altitude estimates.

12. The method as in claim 10, wherein determining the altitude estimate for the first location and the second location includes to:

determining a barometric pressure reading via a barometric pressure sensor of the mobile device; and estimating an altitude based on the barometric pressure.

13. The method as in claim 10, additionally comprising:

determining the baseline barometric pressure reading in response to the calibration signal, the calibration signal to indicate a probability that the mobile device is outdoors and at ground level.

14. The method as in claim 13, additionally comprising:

associating an altitude determined via a global navigation satellite system or a digital elevation model with the baseline barometric pressure.

15. The method as in claim 14, additionally comprising aggregating a first altitude estimate determined for the first location or the second location via the barometric pressure reading with a second altitude estimate determined for the first location or the second location via the global navigation satellite system or the digital elevation model.

16. The method as in claim 10, additionally comprising:

receiving an input via a user interface of the mobile device to initiate an emergency call to an emergency call center;

encrypting location information associated with the mobile device, the location information including an altitude associated with the mobile device; and storing encrypted location information associated with the mobile device to a server, the encrypted location information to be retrieved by an emergency service provider.

17. The method as in claim 16, the method further comprising:

initiating the emergency call to the emergency call center, wherein the altitude associated with the mobile device is determined contemporaneously with initiating the emergency call in response to a determination that an uncertainty associated with the altitude is below a threshold.

18. The method as in claim 16, wherein the mobile device is at a location of interest to the mobile device, the location of interest having a previously determined altitude, and the altitude associated with the mobile device is the altitude of the location of interest.

* * * * *